July 29, 1952  M. K. GORDON, JR  2,605,331
POWER FAILURE INDICATOR

Filed March 11, 1949  2 SHEETS—SHEET 1

INVENTOR.
MALCOLM K. GORDON JR.
BY
ATTORNEY

July 29, 1952    M. K. GORDON, JR    2,605,331
POWER FAILURE INDICATOR

Filed March 11, 1949    2 SHEETS—SHEET 2

INVENTOR.
MALCOLM K. GORDON JR.
BY
ATTORNEY

Patented July 29, 1952

2,605,331

UNITED STATES PATENT OFFICE 2,605,331

POWER FAILURE INDICATOR

Malcolm K. Gordon, Jr., Lodi, N. J., assignor to Bendix Aviation Corporation, Teterboro, N. J., a corporation of Delaware Application March 11, 1949, Serial No. 80,888

5 Claims. (Cl. 177—311)

The present invention relates to an electrical indicating instrument, and more particularly to a power failure indicator.

An object of my present invention is to provide a power failure indicator for electrical networks including polyphase circuits which will show by means of a target of contrasting colors when the power supply fails in any portion of the network or in any phase of the electrical circuit.

A further object of the present invention is to provide a power failure indicator of the general character indicated which will indicate by the target of contrasting colors a loss in power in the network in which such indicator is connected.

Still a further object of this invention is to provide a power failure indicator of the character indicated with a distinctive dial arrangement whereby power conditions of an electrical circuit may be readily observed.

Another object of this invention is to provide a rugged and compact power failure indicator of the general character indicated which will consist of few and simple parts, relatively inexpensive to manufacture, which will be positive in operation, have a large variety of application, and yet be practical and efficient to a high degree in use.

Other objects of the invention will in part be obvious and in part hereinafter pointed out.

The invention accordingly consists in the features of construction, combinations of elements, and arrangements of parts which will be exemplified in the construction hereinafter described.

In the accompanying drawings forming a part of this specification in which one of the various possible illustrative embodiments of this invention is shown, and wherein the same reference characters designate corresponding parts throughout the several views, Fig. 1 is a vertical cross-sectional view taken along the line 1—1 of Fig. 2 with portions in elevation, of a power failure indicator.

Fig. 2 is a front elevational view of the indicator, while

Figure 1:
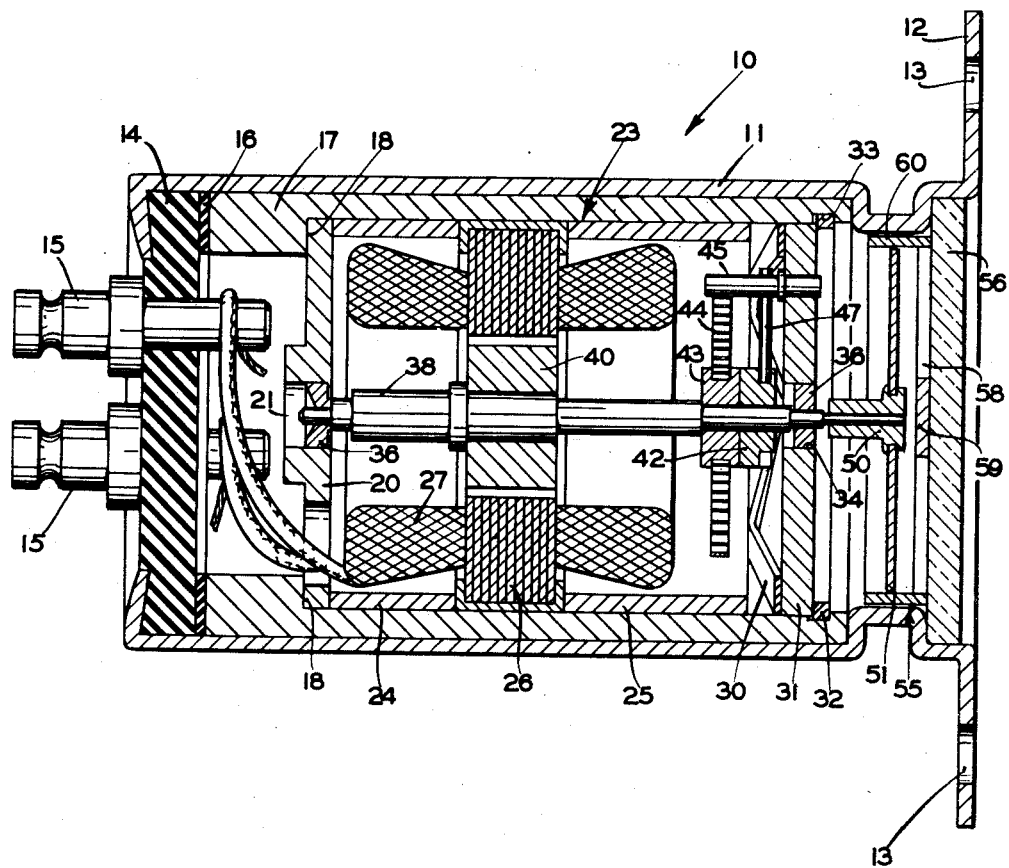

Referring now in detail to the drawings, the numeral 10 designates a power failure indicator embodying one form of my invention. The indicator 10 is housed in a casing 11, the forward end of said casing being flanged as at 12 and formed with the mounting holes 13. Fixed in the rear of the casing in a suitable manner is a wall or cover 14 provided with three electrical terminal posts 15 (only two being shown in the drawings) for connecting the indicator into an electrical circuit.

Within the casing 11 and abutting a resilient gasket 16 is a shouldered shell 17 having an internal shoulder 18. Received within the shell 17 and abutting the shoulder 18 thereon is a plate 20 formed with a centrally disposed opening 21 therein. The plate 20 is a part of a motor enclosure 23 formed by the sleeves 24 and 25 supporting the stator laminations 26 carrying the three phase stator winding 27. The motor enclosure and field assembly are held in place within the shouldered shell 17 by means of a spring washer 30 abutting against the end of sleeve 25 and against a plate 31 held in place by a snap ring 32 disposed in the recess 33 of the shell 17. The plate 31 is also provided with a centrally disposed opening 34 in alignment with the opening 21 of the plate 20.

Fixed in the openings 21 and 34 of the end plates 20, 31 are the bushings 36 supporting an armature shaft 38. The armature shaft carries an armature 40 aligned with the stator poles formed by the laminations 26. The armature 40 may be a permanent magnet, or made of ferrous material such as cold rolled steel, or may be an eddy current cup or disc to form a hysteresis motor.

Integral with the forward end of the shaft 38 are two collars 42 and 43. Fixed to the collar 43 is a coil spring 44, the inner end of said spring being fixed to the collar while the outer end is fixed to a stop pin 45 fixed in the plate 31. The collar 42 has fixed therein radially extending pins 47 and 48 spaced 90° apart, adapted to abut the stop pin 45.

Connection of the stator windings 27 into an A. C. electrical circuit (not shown) will provide a rotating magnetic field in the windings which will tend to rotate the armature 40. The torque delivered by the armature shaft is offset by the torque of the coil spring 44 so that the shaft 38 will rotate about a quarter of a revolution, the rotation being limited by the abutment of the pins 47, 48 and 45. Thus under "power off" condition of the electrical circuit pin 47 will abut the pin 45, while under "power on" conditions the pin 48 will abut the pin 45.

By proper selection of the coil spring 44, a condition less than a "power off" condition in the electrical circuit will provide less than full torque to the armature 40. Thus the shaft 38 will be rotated a portion of a quarter revolution, the degree of displacement being determined by the armature torque and the opposing torque of the coil spring.

Means is now provided to indicate the "power off," "power on," and power loss condition of an electrical circuit.

To this end, the reduced forward end of the shaft 38 is provided with a hub 50 carrying a disc or target 51. The indicating disc 51 is laid out in equal quadrants, the alternate quadrants 53 and 54 being of contrasting colors. The rotatable disc 51 cooperates with an indicating medium 55 on the cover glass 56. The indicating medium 55 comprises a cup 58 made integral with the interior surface of the glass and having the two alternate quadrants thereof cut away to form a banner stone formed covering or shield 59 for the disc 51. The lip 60 of the cup will prevent oblique viewing of the disc 51. The covering 59 may be colored the same as the quadrants 53 of the disc so that any rotation of the disc may be noted by the contrast or lack of contrast in the colors of the visible disc and shield.

Figure 2:
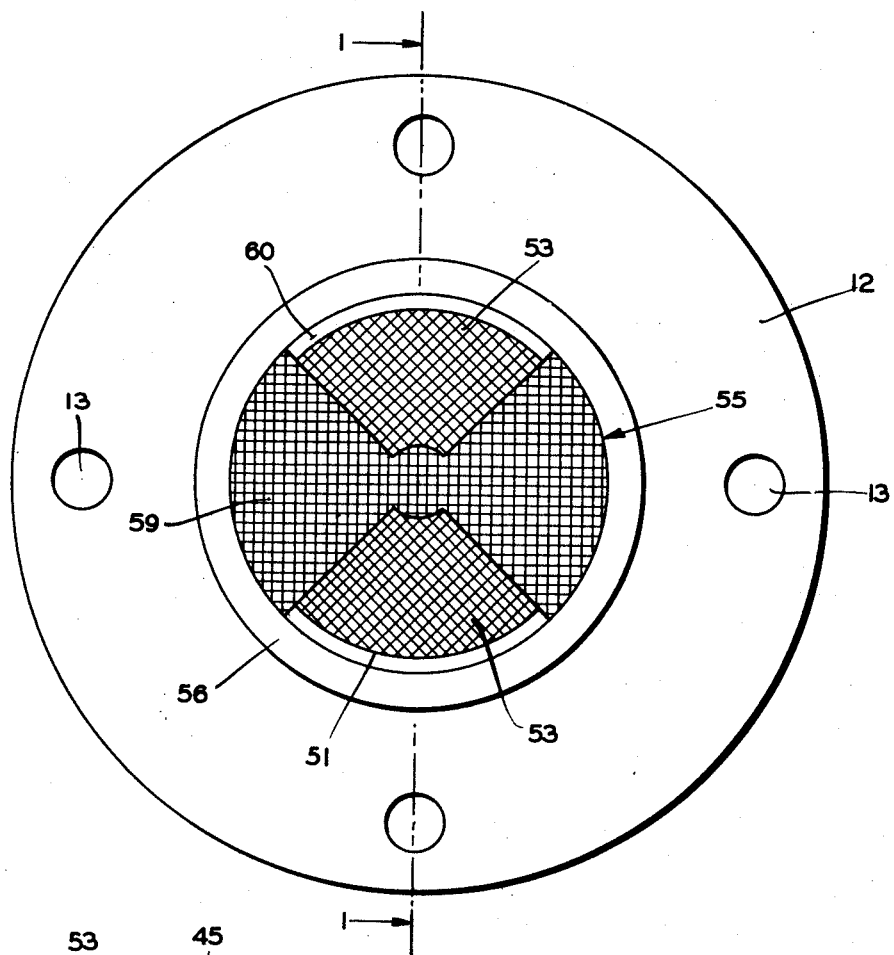
Figure 3:
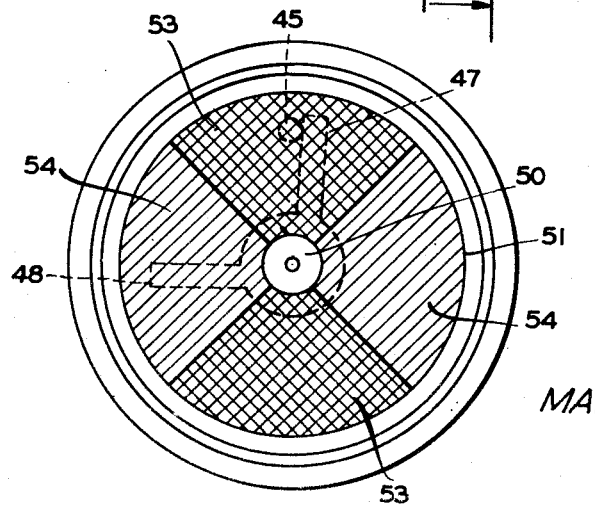
Fig. 3 is an elevational view of the target contrasting colors.

If we assume a "power off" condition of the electrical circuit in which the indicator is connected and the disc 51 positioned as shown in Figs. 2 and 3 with the quadrants 53 visible through the openings in the shield 59, a "power on" condition will cause the disc 51 to be rotated to bring the quadrants 54 into view. The quadrants of the disc could be alternately colored in contrasting colors, or the quadrants 53 could be blackened and the quadrants 54 made luminous by a suitable paint. Thus with the quadrants 53 blackened and the shield blackened, a "power off" condition would be represented by a dark or black configuration, while the "power on" condition would be indicated by the visible luminous quadrants. The type of showing for either "off" or "on" condition may be reversed as desired. In any event, a partial power failure of the electrical circuit will be indicated by the segments of quadrants 53 and 54 visible through the openings in the shield 59.

It will thus be seen that there is provided a power failure indicator in which the several objects of this invention are achieved, and which is well adapted to meet the conditions of practical use.

As various possible embodiments may be made of the above invention, and as various changes might be made in the embodiment above set forth, it will be understood that all matter herein set forth or shown in the accompanying drawings is to be interpreted as illustrative and not in a limiting sense.

Having thus described my invention, I claim as new and desire to secure by Letters Patent:

1. Apparatus for indicating power failure in an electrical circuit comprising an electrical device adapted for connection to said circuit and having a movable part displaced from a normally null position in response to current flow in said circuit, yieldable means for displacing the movable part to its null position in response to power failure in said circuit, limit stops for said movable part, a disc of contrasting colors for said movable part for indicating the null and displaced positions of the movable part, and a shield for said disc, a portion of said disc being visible behind said shield.

2. Apparatus for indicating power failure in an electrical circuit comprising an electrical device adapted for connection to said circuit and having a movable part displaced from a normally null position in response to current flow in said circuit, yieldable means for displacing the movable part to its null position in response to power failure in said circuits, limit stops for said movable part to limit the movement of said movable part to an angular displacement of substantially 90° from its null position, a disc of contrasting colors carried by said movable part for indicating the null and displaced positions of the movable part, and a shield for said disc, a portion of said disc being visible behind said shield.

3. Apparatus for indicating power failure in an electrical circuit comprising an electrical device adapted for connection to said circuit and having a movable part displaced from a normally null position in response to current flow in said circuit, yieldable means for displacing the movable part to its null position in response to power failure in said circuit, limit stops for said movable part to limit the movement of said movable part to an angular displacement of substantially 90° from its null position, a disc laid off in quadrants carried by said movable part for indicating the null and displaced positions of the movable part, alternate quadrants being of contrasting colors; and a shield for said disc of banner stone form, the disc being visible through the opening in said shield.

4. Apparatus for indicating power failure in an electrical circuit comprising an electrical device adapted for connection to said circuit and having a movable part displaced from a normally null position in response to current flow in said circuit, yieldable means for displacing the movable part to its null position in response to power failure in said circuit, limit stops for said movable part to limit angular displacement of the movable part to an angular displacement of substantially 90° between a "power off" and a "power on" condition of the electrical circuit, a disc laid off in quadrants for said movable part, alternate quadrants being of contrasting colors; and a cup for said disc, portions thereof being cut away to form a banner stone formed segment, said disc quadrants being visible through the cut-outs of said cup.

5. Apparatus for indicating power failure in an electrical circuit comprising an electrical device adapted for connection to said circuit and having a movable part displaced from a normally null position in response to current flow in said circuit, yieldable means for displacing the movable part to its null position in response to power failure in said circuit, limit stops for said movable part to limit angular displacement of the movable part to an angular displacement of substantially 90° between a "power off" and "power on" condition of the electrical circuit, a disc laid off in quadrants for said movable part, alternate quadrants being of contrasting colors; and a cup for said disc, said disc being rotatable therein, said cup having alternate quadrants cut out therefrom to permit viewing of said disc through the spaced quadrants of said cup.

MALCOLM K. GORDON, Jr.

REFERENCES CITED

The following references are of record in the file of this patent:

UNITED STATES PATENTS

| Number | Name | Date |
| --- | --- | --- |
| 408,018 | Knowles | July 30, 1889 |
| 1,131,202 | Boyden | Mar. 9, 1915 |
| 1,615,664 | Warren | Jan. 25, 1927 |
| 1,913,937 | Loffler | June 13, 1933 |
| 2,138,430 | Rudd | Nov. 29, 1938 |
| 2,488,824 | Olie | Nov. 22, 1949 |